United States Patent Office 2,918,745
Patented Dec. 29, 1959

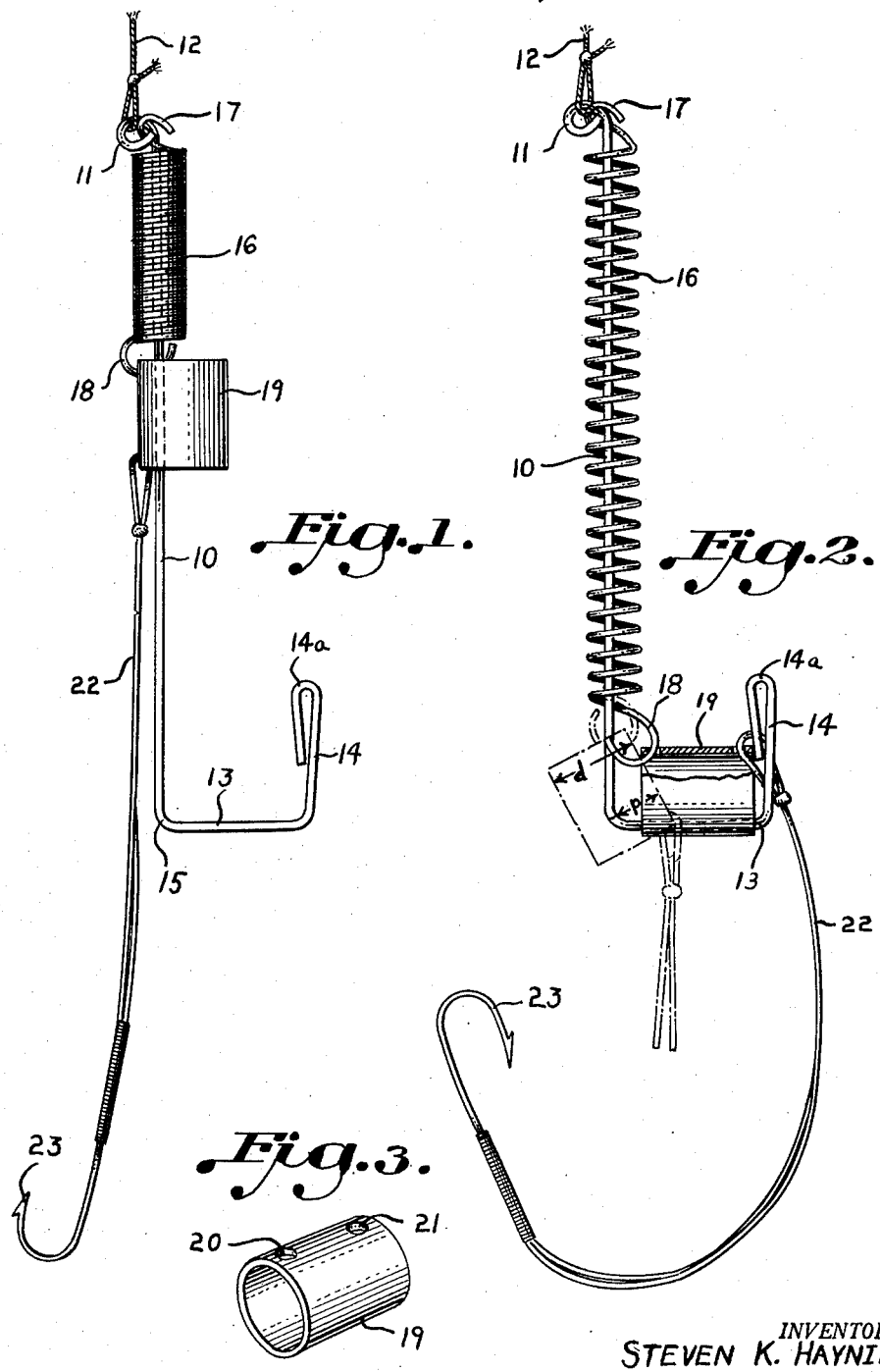

2,918,745

FISHHOOK SETTER

Steven K. Haynie, Ashland, Ohio

Application December 27, 1956, Serial No. 630,853

2 Claims. (Cl. 43—15)

This invention relates to a device for automatically setting a fishhook into a fish.

As described in my United States Patent No. 2,559,537, dated July 3, 1951, there are a number of forms of still fishing devices, among which are single lines and hooks hung from a pole on the bank of a body of water, a number of baited hooks included in a trot line, or in an auxiliary line hung from a trot line, all of which are untended and depend on the action of the fish alone to set the hook in the mouth of the fish. The fishhook setter described and claimed in my patent serves to set the hook in the fish automatically when the fish nibbles at the bait on the hook.

The form of fishhook setter patented by me has several disadvantages, principal among them being the difficulty of securely preparing the device for operation so that it will operate automatically when the fish nibbles at the bait, and the extreme sensitivity of the device, due to which it is often actuated before it can be placed in position in the water.

It is an object of the present invention to provide an improved form of fishhook setter which is easy to prepare for operation.

It is a further object of this invention to provide an improved form of fishhook setter which is stable when it is in the condition in which it is ready to operate yet which is extremely sensitive when the fishhook is disturbed by a fish nibbling at the bait thereon.

Other and further objects of the present invention will become apparent from the following description together with the appended claims and the accompanying drawing, in which:

Fig. 1 is a plan view of the fishhook setter according to the invention before it is prepared for operation;

Fig. 2 is a similar view of the fishhook setter in position for operation; and

Fig. 3 is a perspective view of the collar for the fishhook setter.

The fishhook setting device according to the invention comprises a shaft 10 having an eye 11 on one end thereof to which a line 12 may be attached. A lateral extension 13 is provided on the shaft 10, the end 14 of the extension being bent parallel to the shaft 10 and formed with a loop 14a therein. The loop merely serves the purpose of finishing off the end of the extension. The shaft 10 and the lateral extension 13 form a shoulder 15 between them.

A coil tension spring 16 is secured to the eye 11 by means of a loop 17 on the end of the spring. To a similar loop 18 on the other end of the spring 16 is secured a collar 19 around the shaft 10. The collar 19 has a hole 20 therein adjacent one end thereof through which the loop 19 on the spring 16 passes, and aligned with this hole 20 is a second hole 21 on the other end of the collar, the hole 21 constituting means for the attachment of a leader 22 for a fishhook 23.

The collar 19 has a diameter greater than a perpendicular from the shoulder 15 to a hypotenuse between the shaft 10 and the lateral extension 13 which is formed by a side of the collar 19. As seen on the dotted outline of collar 19 in Fig. 2, the diameter $d$ is greater than the perpendicular $p$.

To prepare the fishhook setter for operation, the collar 19 is seized in the position shown in Fig. 1 and slid down the length of the shaft 10 and over the shoulder 15 onto the lateral extension 13 against the action of the coil spring 16. In this position, both of the holes 20 and 21 are toward the spring 16 and the other side of the inside of the collar bears against the lateral extension 13.

When the leader 22 is pulled, the collar 19 is pivoted around the loop 18, and the edge toward the shaft 10 is passed around the shoulder 15. The coil spring 16 then quickly and forcibly draws the collar 19 and hence the leader 22 and fishhook 23 toward the eye 11 on the other end of the shaft 10. The hook is thus set into the fish.

Because the collar 19 is easy to grasp with the fingers it is a simple matter to prepare the device for operation. Further, because the collar 19 is positioned on the lateral extension 13 under the action of the spring 16, it is in a stable position thereon, and the only action to which it is sensitive is a pull on the leader. Touching the spring, the collar itself, or the shaft 10 will not cause the collar 19 to come off the lateral extension 13.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A fishhook setting device comprising a smooth shaft having an eye on one end thereof and a lateral extension on the other end thereof extending substantially perpendicularly to the length of said shaft, a tension spring having one end secured to the eye on said shaft and extending along said shaft toward said lateral extension, and an elongated cylindrical collar around said shaft of a length substantially equal to the length of said lateral extension, to the end of which collar closest to the eye on said shaft is attached the other end of said spring, said collar having an internal diameter of such a dimension that it may be moved onto said lateral extension to hold said cylindrical collar in a cocked position against the biasing action of said spring, and fishhook attaching means secured to the other end of said collar in such a manner that when a pull is exerted on said fishhook attaching means said collar is released from its cocked position, whereby a jerk is applied to the fishhook attaching means by said spring to set a fishhook on said fishhook attaching means in a jaw of a fish.

2. A fishhook setting device comprising a smooth shaft having an eye on one end thereof and a lateral extension on the other end thereof extending substantially perpendicularly to the length of said shaft, a tension spring having one end secured to the eye on said shaft and extending along said shaft toward said lateral extension, and an elongated cylindrical collar around said shaft to the end of which collar closest to the eye on said shaft is attached the other end of said spring, said collar having an internal diameter of such a dimension that it may be moved onto said lateral extension to hold said cylindrical collar in a cocked position against the biasing action of said spring, and a fishhook attaching means secured to the other end of said collar in such a manner that when a pull is exerted on said fishhook attaching means said collar is released from its cocked position, whereby a jerk is applied to the fishhook attaching means by said spring to set a fishhook on said fishhook attaching means in a jaw of a fish.

References Cited in the file of this patent

UNITED STATES PATENTS

| | | |
|---|---|---|
| 283,444 | Wentworth | Aug. 21, 1883 |
| 1,604,725 | Sprangel | Oct. 26, 1926 |
| 1,934,536 | Hawkinson | Nov. 7, 1933 |
| 2,204,560 | Allison | June 18, 1940 |

FOREIGN PATENTS

| | | |
|---|---|---|
| 14,386 | Norway | Mar. 4, 1905 |
| 171,951 | Austria | July 29, 1952 |